UNITED STATES PATENT OFFICE.

SAMUEL RODGERS, OF SAN FRANCISCO, CALIFORNIA, ASSIGNOR TO THE AMERICAN CAP COMPANY, OF SAME PLACE.

DETONATING COMPOUND.

SPECIFICATION forming part of Letters Patent No. 489,761, dated January 10, 1893.

Application filed January 15, 1892. Serial No. 418,181. (No specimens.)

*To all whom it may concern:*

Be it known that I, SAMUEL RODGERS, a citizen of the United States, residing in the city and county of San Francisco, State of California, have invented an Improvement in Detonating Compounds; and I hereby declare the following to be a full, clear, and exact description of the same.

My invention consists of a detonating compound which is especially applicable for use in caps to be employed for exploding charges of powder.

In the preparation of my compound I employ picrate of potash, chlorate of potash, logwood and a gallotannic ink.

In preparing my compound I take one part or say forty-three per cent. of picrate of potash, one part or say forty-three per cent. of chlorate of potash, twelve per cent. of solution of extract of logwood, and two per cent. of any good nut gall iron ink. The logwood is in the form of finely divided powder which is produced by making a decoction of logwood in water, then evaporating the water until a solid residue remains which is sold under the name of extract of logwood. This is mixed with water in the proportion of one pound of the extract to ten pounds of water. The ink, picrate, and chlorate of potash, are added, and the whole is then triturated or ground until it becomes a pasty mass, the ingredients of which are intimately mixed. While in this wet, pasty state, the caps are filled with the material, and afterward dried until the moisture is entirely evaporated when they will be ready for use.

Having thus described my invention, what I claim as new and desire to secure by Letters Patent is—

A detonating compound consisting of picrate of potash, chlorate of potash, extract of logwood, and a gallotannic ink, substantially in the proportions herein described.

In witness whereof I have hereunto set my hand.

SAMUEL RODGERS.

Witnesses:
S. H. NOURSE,
J. A. BAYLESS.